United States Patent [19]

Brain

[11] Patent Number: 5,008,755
[45] Date of Patent: Apr. 16, 1991

[54] DIGITAL VIDEO SPECIAL EFFECT SYSTEM

[75] Inventor: Adrian R. Brain, Reading, England

[73] Assignee: Abekas Video Systems Ltd., United Kingdom

[21] Appl. No.: 508,263

[22] Filed: Apr. 12, 1990

[30] Foreign Application Priority Data

Apr. 21, 1989 [GB] United Kingdom ............... 8909079

[51] Int. Cl.$^5$ ............................................ H04N 5/262
[52] U.S. Cl. ...................................... 358/183; 358/22; 358/182
[58] Field of Search .................. 358/183, 22, 182, 181

[56] References Cited

U.S. PATENT DOCUMENTS

| | | | |
|---|---|---|---|
| 4,200,890 | 4/1980 | Inaba | 358/183 |
| 4,266,242 | 5/1981 | McCoy | 358/22 |
| 4,356,511 | 10/1982 | Tsujimura | 358/182 |
| 4,409,618 | 10/1983 | Inaba | 358/183 |
| 4,628,363 | 12/1986 | Kashiwa | 358/22 |
| 4,796,089 | 1/1989 | Imai | 358/182 |

Primary Examiner—Howard W. Britton
Assistant Examiner—Sherrie Hsia
Attorney, Agent, or Firm—Limbach, Limbach & Sutton

[57] ABSTRACT

A digital video special effect system for merging or replacing a first video image with a second video image. A first special effect means receives digital video information relating to a first picture sequence and transitions can be implemented in order to change the format of the image. Second special effect means provides the same facility for a second video image whereby the first and second images can be combined. A common memory stores commands to cause the first and second special effect means to cooperate on a common time-line whereby the durations of the picture sequences are automatically adjusted in order to provide a smooth combination of video images.

2 Claims, 1 Drawing Sheet

DIGITAL VIDEO SPECIAL EFFECT SYSTEM

This invention relates to digital video special effect system which can be used, for example, to provide a combined Mix/wipe and Size/Position transitions.

Special effects are frequently used in television to join one sequence of video information to another, e.g., either in editing, or in cutting from camera to camera, etc. One such effect, which is termed "mix/wipe" involves an increasing wipe-out of an original picture and the simultaneous substitution of another picture in the wipe-out region. For example a simple wipe-out would involve transitioning the original picture slowly from one edge towards an oppsite edge and introducing the fresh picture as the edge moves across the frame. An alternative technique is to provide a vignette, e.g., having a star shape, which grows in size so that a fresh picture gradually replaces an originnal picture. During this process, both pictures can be seen until one is entirely transitioned. Hence the picture information is mixed in a device which is dedicated to producing this effect.

Another special effect involves an alteration in the size and position of picture information. For example, if it were required to shrink the frame size of the picture into the smaller size on the same screen and to move the shrunken image to a particular region on the same screen, such a transition would be handled by a device dedicated to producing such an effect.

FIG. 1a illustrates a typical conventional system wherein the Mix/Wipe and the Size and Position device 1 and 2 are separate from one another and have their own individual memories 3 and 4 for storing information relating to their respective functions. A DSK (Down Stream Keyer) 5 is used to control mixing a TRIGGER signal input 6 is used to key in additional source material, e.g. in order to add a caption to a composite of the Mix/Wipe and the Size and Position effects.

When it is required to wipe a first image with a vignette containing a reduced second image that is gradually expanded to replace the first image, the following process is normally carried out. The Size and Position device performs its function on each piece of picture information prior to building up an image to fill the vignette in the Mix/Wipe device. These two functions are separately implemented, as shown in FIG. 1a, to achieve the final result. The Mix/Wipe device and the Size and Position device communicate continually during the process of achieving this special effect. A communication link 7 is schematically shown in the broken line in FIG. 1a. Since the Size and Position function must operate on the picture information prior to the Mix/Wipe function, the communication is effectively in "serial" form. As the Mix/Wipe and the Size and Position devices are separate and have independent memories they operate in accordance with their own respective time-lines (n.b. the term "time-line" relates to time in the sense of the speed at which the particular device operates) and they require their own individual triggers to start and to stop a picture sequence. It is therefore essential to pre-run and/or to calculate the durations of the different effects, i.e. to rehearse them, so that the Mix/Wipe sequence and the Size and Position sequence are properly merged into a total picture sequence. This is not only time-consuming but it is difficult to achieve since an alteration in the time-line of one picture sequence has an effect elsewhere in the total sequence (and often in several places) which means that further alterations are required to rectify the situation. Thus more operator involvement is necessary and much time can be wasted in rehearsing to achieve the total effect. (The operator may be actively engaged in providing a special effect, i.e. by operating controls, or the special effect may be the result of some previous editing and stored on tape).

The present invention recognises the latter problems and seeks to provide a solution whereby special effects can be more easily achieved without the limited and restricted form of communication between the two devices and their respective memories.

In accordance with the invention, a digital video special effect system comprises:

(a) first special effect means for receiving digital video information relating to a first picture sequence and for implementing position transitions so as to provide video information representing a transitioned first picture sequence, and (b) second special effect means for receiving digital information relating to a second picture sequence and for receiving the video information representing the transitioned first picture sequence, said second special effect means implementing transitions for merging or replacing said first picture sequence with a transitioned second picture sequence, and the system being characterised in that common memory means are provided in which data is stored relating to the video information representing the transitioned first picture sequence together with the video information relating to said transitioned second picture sequence and in which commands are stored for causing said first special effect means and said second special effect means to cooperate on a common time-line whereby the durations of said picture sequences are automatically adjusted in accordance with input data relating to said required replacement in order to produce a required total effect.

A particular advantage of the invention is that the 'time' is changed everywhere by the command information so that each picture sequence merges into the next in accordance with the required total mix effect and hence no time is wasted in rehearsing and in making repeated alterations to achieve the desired mix. Moreover, the invention has only one memory which is used to store all transitions e.g. whether or not they are Size and Position, Mix/Wipe or DSK. This is possible because no differentiation is made between the Mix/Wipe, the Size and Position and DSK effects. Thus, the memory stores all of the information required to produce a combined effect and the system is conditioned to replace time-lines of a number of transitions with a singel time-line on which commands are imposed for centrally controlling the desired overall effect. This avoids the limitations and restrictions due to the independent and serial form of communication of the prior art.

An embodiment of the invention will now be described with reference to FIGS. 2a and 2b of the accompanying schematic drawings, in which drawings:

FIG. 2b illustrates the combined functions of the system shown in FIG. 2a.

Figure 1A:
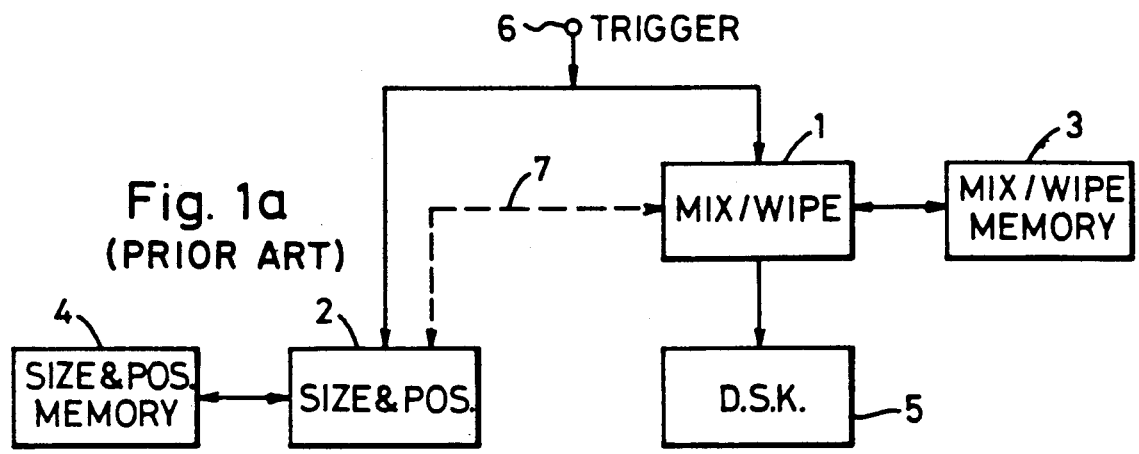
FIG. 1a illustrates a conventional system.
Figure 1B:
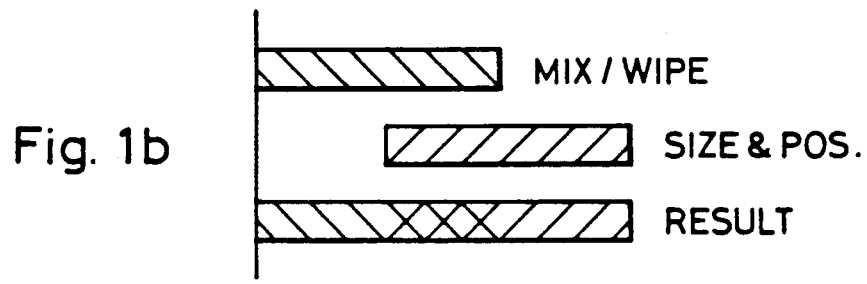
FIG. 1b illustrates the separate Mix/Wipe and Size and Position functions performed by the conventional system of FIG. 1a, FIG. 2a illustrates an embodiment of the invention.
Figure 2A:
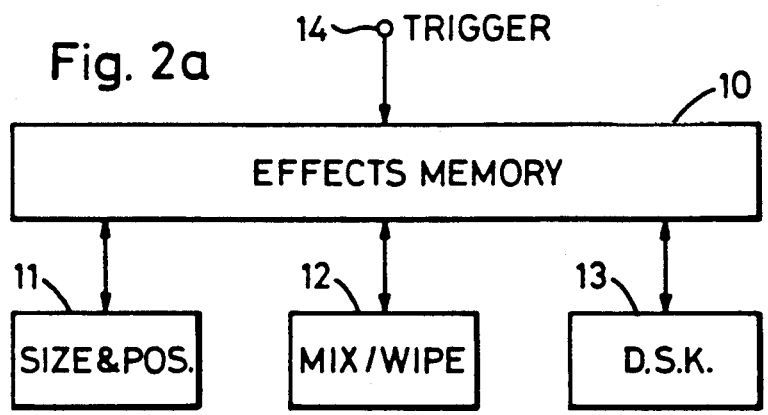
Figure 2B:
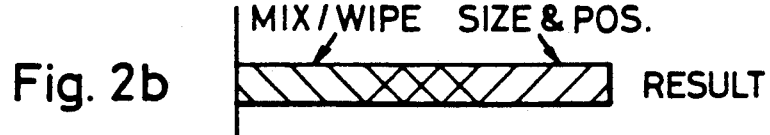

As shown in FIG. 2a, an embodiment of the invention comprises a single special effects memory 10 (such as a standard 32K by 8 static RAM) to which is connected a Size and Position means 11, Mix/Wipe means 12 and Down Stream Keyer 13. A Trigger pulse input 14 initiates a required function so as to produce the combined effect, e.g. on a TV screen. Whilst a Size and Position special effect and a Mix/Wipe special effect and a DSK are specifically mentioned, it will be understood that other special effects or sources could be used.

The Size and Position means 11 is of conventional construction and is capable of handling digital video information and producing a data stream representing a picture of, e.g., reduced size and a shifted position. The position shift is carried out with respect to the raster of a given frame. Similarly, the Mix/Wipe means 12 is of conventional construction and is capable of handling digital video signals and producing a data stream representing the required Mix/Wipe function. The Down Stream Keyer 13 is of conventional construction and it is used, for example, to key a caption generator so as to add (e.g.) a newsreader's name to the composite picture. A single trigger initiates the interactions between the Size and Position means 11, the Mix/Wipe means 12, the DSK 13 and the memory 10 i.e. on the same time-line. The two data streams are thereby combined in accordance with a predetermined 'master plan' so that the various picture effects are automatically merged into the required total effect which can then be supplied to a television screen or a transmission system.

As those skilled in the art will appreciate the construction and operation of the individual means shown in FIG. 2a, as well as the way in which the system can be programmed to cause the digital data streams to be combined, no further detailed description will given.

I claim:
1. A digital special effect system, including:
 (a) a first special effect means for receiving digital video information relating to a first picture sequence and for implementing transitions so as to provide video information representing a transitioned first picture sequence;
 (b) a second special effedt means for receiving digital video information relating to a second picture sequence, for receiving the video information representing the transitioned first picture sequence, and for implementing transitions for merging or replacing the transitioned first picture sequence with a transitioned second picture sequence; and
 (c) a common memory means for storing data relating to the video information representing the transitioned first picture sequence, data relating to the video information representing the transitioned second picture sequence, and commands for causing the first special effect means and the second special effect means to cooperate on a common time-line, wherein the system automatically adjusts durations of said picture sequences, in accordance with input data relating to said merging or replacing, to produce a required total effect.

2. The system of claim 1, wherein the first special effect means is a size and position special effect means and wherein the second special effect means is a mix/wipe special effect means.

* * * * *